Jan. 15, 1963 J. W. BOWERSOX 3,073,551
VERTICAL LIFT AIRCRAFT
Filed June 1, 1959 4 Sheets-Sheet 1

JOSEPH W. BOWERSOX
INVENTOR

HUEBNER & WORREL
ATTORNEYS

Jan. 15, 1963   J. W. BOWERSOX   3,073,551
VERTICAL LIFT AIRCRAFT
Filed June 1, 1959   4 Sheets-Sheet 2

JOSEPH W. BOWERSOX
INVENTOR

HUEBNER & WORREL
ATTORNEYS

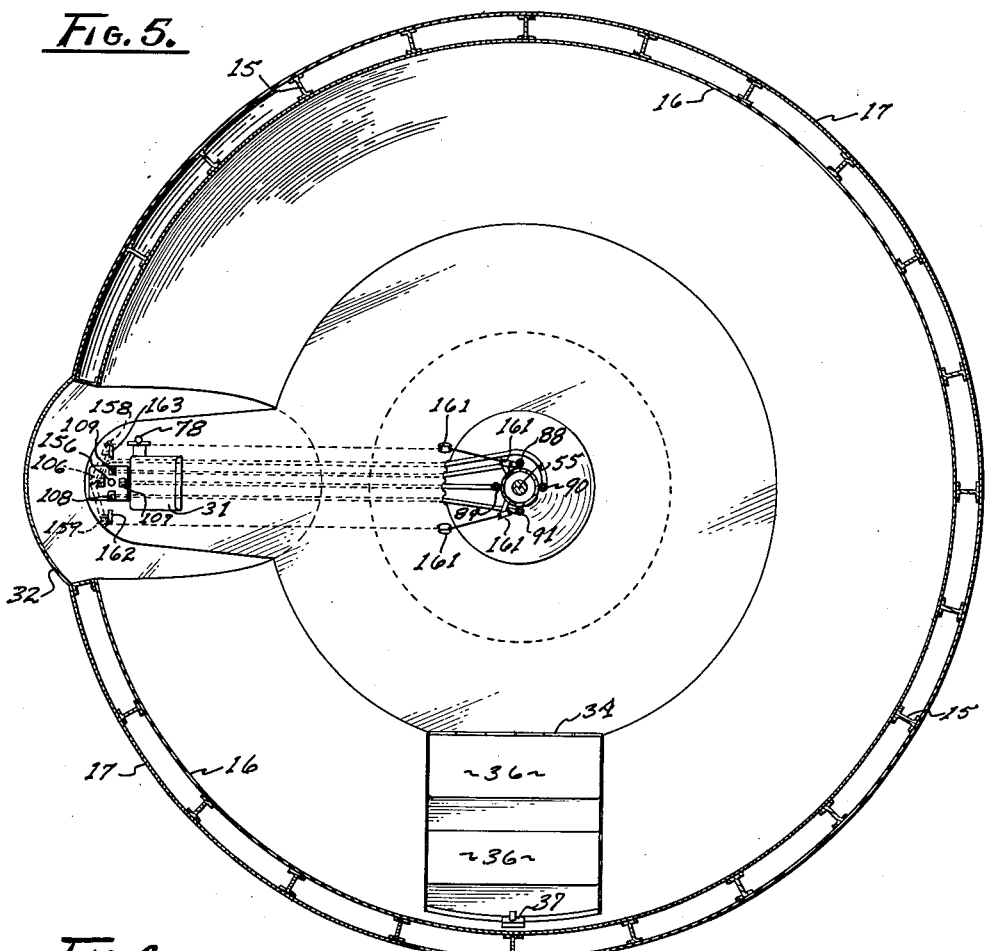
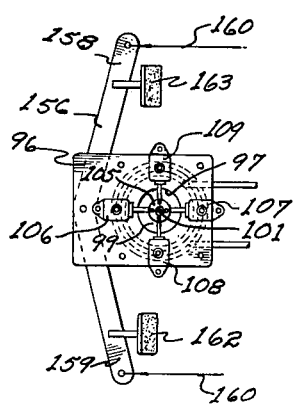
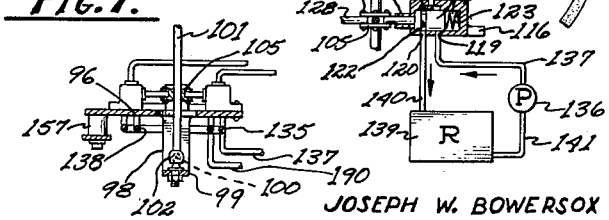

Jan. 15, 1963    J. W. BOWERSOX    3,073,551
VERTICAL LIFT AIRCRAFT
Filed June 1, 1959    4 Sheets-Sheet 4
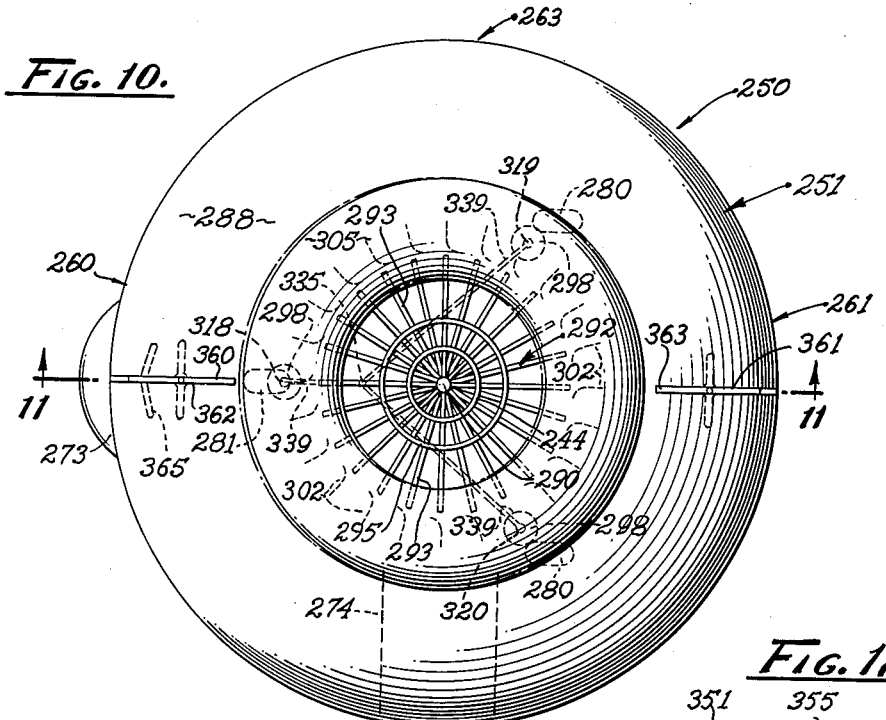
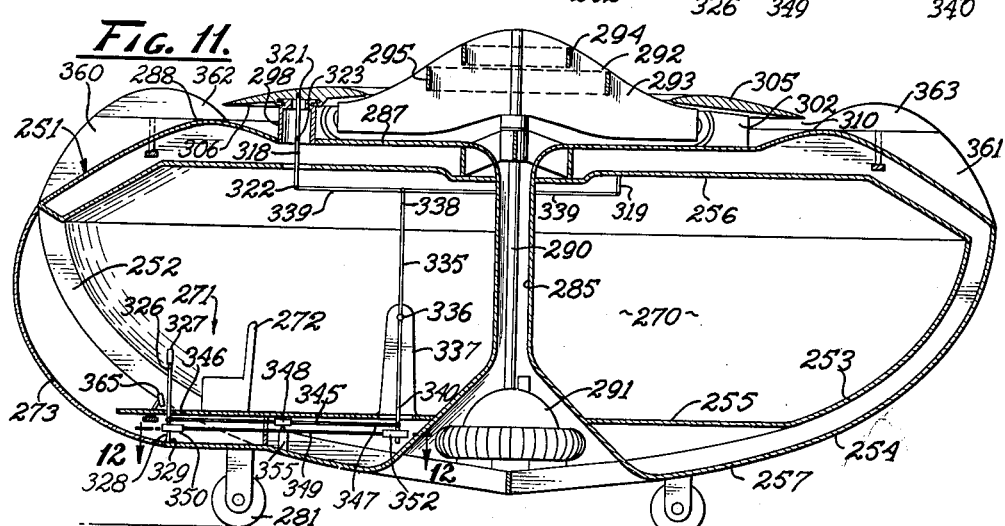
JOSEPH W. BOWERSOX
INVENTOR.
HUEBNER & WORREL
ATTORNEYS
BY Richard M. Worrel

United States Patent Office 3,073,551
Patented Jan. 15, 1963

3,073,551
VERTICAL LIFT AIRCRAFT
Joseph W. Bowersox, Carmel, Calif., assignor of one-half to Wilbert C. Bradshaw, Fresno, Calif.
Filed June 1, 1959, Ser. No. 817,339
4 Claims. (Cl. 244—23)

The present invention relates to vertical lift aircraft and more particularly to a form thereof in which a stationary airfoil is utilized as the principal lifting medium.

Restricted areas for landing and take-off procedures have long motivated a quest for forms of aircraft capable of carrying payloads to and from points of destination and/or departure having only minimum space for the aircraft. Ship decks, densely populated areas, the roofs of buildings, and wilderness regions typify such restricted areas. Several types of vertical lift aircraft have resulted from the extensive efforts to find solutions to the problem. These have largely been divided into two classes of aircraft; the reaction propulsion group including jets and rockets and the rotary wing type including autogiros and helicopters. Both types of aircraft have been excellently suited to certain operational requirements but all have been subject to obvious difficulties when subject to different requirements. For example, vertical take-off rockets and jets are quite expensive to produce and operate, are operable only at extremely high speeds and are sometimes difficult to control. Autogiros and helicopters encounter structural difficulties in the provision of efficient rotary wings, require accurate and coordinate modification of the angles of attack of the rotary wings to achieve azimuthal stability and control as well as overall elevational control. Of less importance but of some significance, light shining through the rotary wings of autogiros and helicopters is caused to flickers to such an extent that pilots and passengers of such aircraft sometimes are disturbed and actually are made ill by the continued flicker.

An object of the present invention is to provide a vertical lift aircraft capable of horizontal flight which employes a fixed airfoil for lifting purposes.

Another object is to provide an aircraft of the character described which has simplified and improved azimuthal and elevational control.

Another object is to provide a new type of vertical lift aircraft avoiding reaction propulsion and rotary wings as well as the difficulties incident to each.

Another object is to create lift in an aircraft by motivating air radially outwardly over an annular airfoil.

Another object is to provide for simple and precise control of the velocity of air passed outwardly over such an annular airfoil both as to the overall velocity controlling ascent and descent of the aircraft as well as the comparative velocities at various azimuthal positions to control fore and aft, port and starboard control.

Other objects are to provide an aircraft of the type described which is economical to produce and operate, stable, precisely controllable, durable, and highly effective for accomplishing its intended purposes.

These and other objects will become more fully apparent upon reference to the subsequent description.

In the drawings:
FIG. 1 is a top plan view of an aircraft embodying the principles of the present invention.

FIG. 5 is a somewhat enlarged horizontal section taken on a plane at a position represented by line 5—5 in FIG. 2.

FIG. 6 is a somewhat enlarged top view of a portion of a control mechanism for operating the aircraft.

FIG. 7 is a vertical section taken through the control mechanism shown in FIG. 6.

FIG. 8 is a diagrammatic view of an hydraulic system employed with the control mechanism of FIGS. 6 and 7.

FIG. 10 is a plan view of a third form of the invention.

FIG. 11 is a diammetrical vertical section taken on line 11—11 of FIG. 10.

FIG. 12 is an enlarged plan view of a lateral flight control bar 349 employed in the third form of the invention, taken on line 12—12 of FIG. 11.

FIG. 13 is a somewhat enlarged portion of the vertical section of FIG. 11 illustrating part of the control system utilized.

Figure 1:
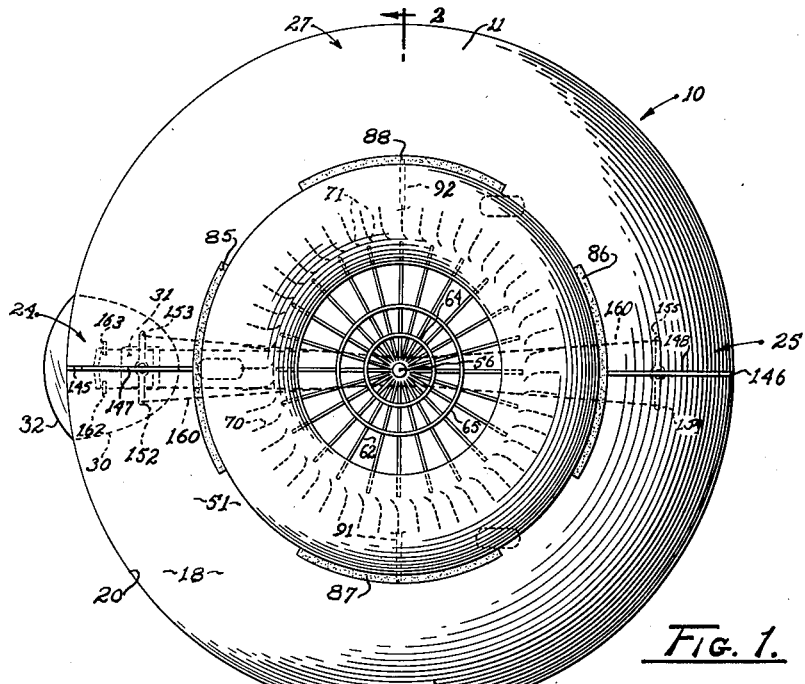

Referring more particularly to the drawings, a vertical lift aircraft of the type which is heavier-than-air is indicated at 10 in FIG. 1. The aircraft provides a substantially discoidal fuselage or body 11. The shape of the fuselage is substantially that of an annular torus and may also be considered as approximating an oblate ellipsoid. It is to be noted that the fuselage is symmetrical about a central axis of revolution which is substantially vertical when the craft is in level flight, as will be seen hereinafter. The fuselage 11 is conveniently of monocoque construction reinforced by a plurality of ribs or formers 15 which are arranged to conform to the above described shape of the fuselage and are in circumferentially spaced relation to each other, as best seen in FIG. 5. The fuselage has an inner skin or hull 16 and an outer skin or hull 17 which provide upper and lower walls 18 and 19 interconnected at a peripheral edge 20. It will be evident that the lower wall of the fuselage provides a floor for a compartment 22 enclosed by the fuselage and that the upper wall forms a ceiling therefor.

For descriptive convenience, the fuselage 11 has a forward portion 24, an aft portion 25, a port side 26 and a starboard side 27. As will be more fully explained, but as a matter of preliminary reference, the aircraft has predetermined forward and rearward axis of reference substantially aligned with the forward and aft portions and a transverse axis of reference substantially aligned between the port and starboard sides.

The compartment 22 of the fuselage 11 provides a forward cockpit section 30 wherein is located a pilot's seat 31. The fuselage has a plastic nose bubble or window 32 outwardly bulged in front of the cockpit section. A ramp or cabin door 33 is provided and is mounted on hinges 34 for pivotal movement between a closed position over a hatchway 35 in the fuselage, as seen in full lines in FIG. 2, and an open position, as seen in dashed lines in FIG. 2. The ramp provides a series of steps 36 which are conveniently disposed when the ramp is open to permit passengers to board the aircraft. A lock 37 is provided for maintaining the ramp in closed position.

The aircraft 10 has a tricycle landing gear which includes a pair of rear wheels 40 mounted on the fuselage 11 for rotation on substantially aligned fixed axles 41 and a nose wheel 42 mounted in swivelling movement on the fuselage and in triangular relation to the rear wheels. It will be evident as the description proceeds that the aircraft is not limited to a tricycle landing gear. Other landing gears well known in the art may be employed and in fact, the aircraft may be operated without the use of any landing gear.

The fuselage 11 circumscribes a central opening 45 which preferably has a lower endwardly divergent portion 46 and an upper portion 47 likewise slightly endwardly divergent. The upper wall 18 of the fuselage has an inner substantially flat portion 49 substantially radially extended outwardly from the central opening. The upper wall also provides an outer airfoil portion 50 outwardly and upwardly curved from the inner portion 49 to provide an upper camber 51 and thence downwardly extended in substantially frustoconical from angularly related to the inner portion 49, as indicated at 52. The airfoil portion thus has an inner leading edge adjacent to the inner portion and an outer trailing edge. It is also to be noted that the airfoil portion provides chords which are substantially radial to the axis of revolution of the fuselage. As is well known in the art, the chord of an airfoil represents the line of a straight edge brought into contact with the lower surface of the airfoil at two different points or as sometimes otherwise expressed, a straight line interconnecting the leading and trailing edges of an airfoil.

An elongated drive shaft 55 provides an upper end portion 56 rotatably mounted in a bearing 57 and a lower end portion 58. The bearing mounts the shaft concentrically of the fuselage 11, and therefore the airfoil portion 50, and is secured to the fuselage by means of struts 59. A propeller 61 provides a plurality of substantially flat vertically disposed blades 62 connected to the upper end portion 56 of the drive shaft and extended radially outwardly therefrom. A thrust collar 63 is secured to the shaft above the bearing for resisting downward thrusts on the shaft as a result of propeller rotation. The propeller blades have inner thickened portions and are gradually narrowed outwardly thereof above the inner portion 49 of the upper wall 18. A pair of substantially vertical annular baffles 64 and 65 are secured to the inner thickened portions of the blades in concentric relation to the shaft for a purpose to be described.

Figure 2:
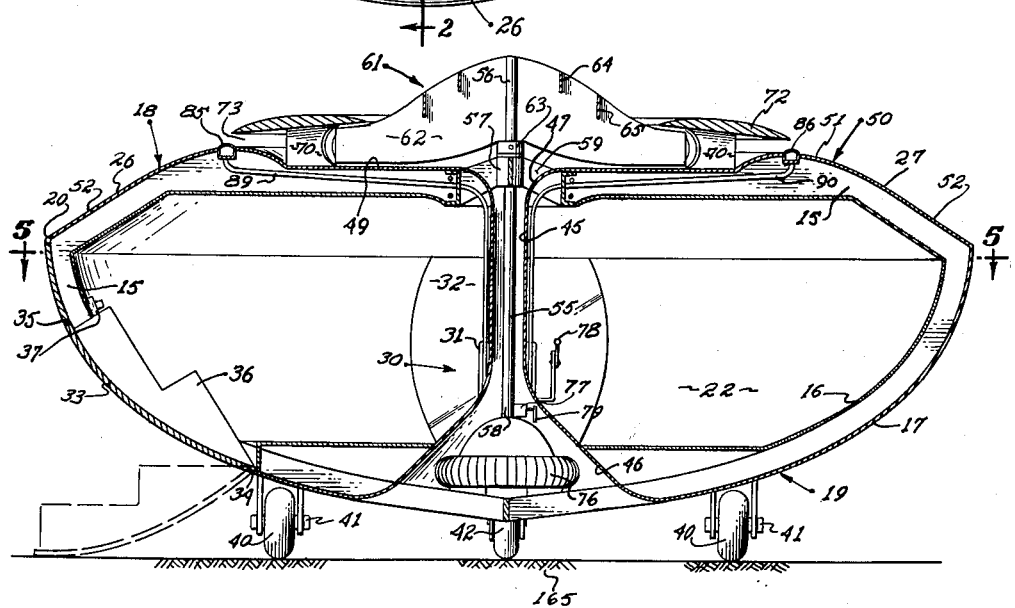
FIG. 2 is a vertical transverse section taken on line 2—2 of FIG. 1, and showing a combined ramp and hatch provided in the aircraft in a closed position in full lines and in an open position in dashed lines.

A plurality of vanes 70 are secured to the inner portion 49 of the upper wall 18 of the fuselage 11 and are upwardly extended therefrom in spaced circumscribing relation to the propeller blades 62 so as not to interfere with rotation of the propeller. The vanes are in radial relation to the drive shaft 55 and have inner ends 71 curved in a common direction circumferentially of the propeller 61 and in a direction opposite to the direction of travel of the propeller. The vanes thus act to direct air thrust outwardly by the propeller in substantially radial directions therefrom. An annular air guiding plate 72 is mounted on the vanes in marginally over-lapping relation to the narrowed outer portions of the blades 62 and to the airfoil portion 50, as best seen in FIG. 2. The guide plate preferably has a slightly curved upper surface and a substantially flat lower surface and forms together with the vanes, the inner wall portion 49 and the airfoil portion 50, a slipstream passageway, generally indicated at 73.

An internal combustion engine 76, or other suitable powered means, is mounted in the fuselage 11 and is connected in driving relation to the lower end 58 of the drift shaft. The engine has a carburetor 77 which is controlled by a throttle 78 located adjacent to the pilot's seat 31 in the cockpit and which is connected to the carburetor by means of a control cable 79. It will be apparent that the throttle constitutes an elevational control means for the aircraft inasmuch as it controls the speed of rotation of the propeller 61.

Forward, aft, port and starboard azimuth control tubes 85, 86, 87 and 88, respectively, are mounted in the upwardly curved section 51 of the airfoil portion 50. These tubes are arcuately arranged in concentric relation to the axis of revolution of the fuselage and are made of inflatable elastic material. The tubes are adapted for distention upwardly into the slipstream passageway 73 toward the air guiding plate 72 to constrict said passageway and thereby to regulate the flow of air over the airfoil portion 50. Conduits 89, 90, 91 and 92 are respectively connected to the tubes and are extended downwardly into the fuselage to the cockpit 30.

With particular reference to FIGS. 5, 6, 7 and 8, a control plate 96 is mounted in substantially horizontal position in the cockpit 30 in front of and below the pilot's seat 31 and provides a central opening 97. An arm 98 is downwardly extended from the control plate and mounts a flange 99 in substantially parallel relation to the control plate. A ball 100 is upwardly disposed on the flange, and a joystick 101 extended upwardly through the opening 97 provides a downwardly disposed socket 102 universally mounted on the ball.

A sleeve 105 is longitudinally slidably mounted on the joystick 101 above the plate. Forward, aft, port and starboard azimuth control valves 106, 107, 108 and 109 are provided and are controlled by the joystick in a manner to be described. Inasmuch as all of the control valves are identical in construction, only one thereof is described in detail and the same numerals are given to similar parts of all of the valves.

By reference to FIG. 8, each of the control valves 106, 107, 108 and 109 provides a housing 115 having an outer lug 116 pivotally connected to the control plate 96 and an internal chamber 117. The housing has an elongated control port 118, an inlet port 119, and a reservoir return port 120, all of which are in communication with the chamber. A valve member 121 is slidably mounted in the chamber and has a transverse bore 122 therein. The valve member is adapted for reciprocal movement between an outer position establishing fluid communication between the inlet port and the control port and an inner position establishing fluid communication between the control port and the reservoir return port. A compression spring 123 is interposed the housing and the valve member for urging the latter into inner position.

The lugs 116 of the control valves 106, 107, 108 and 109 are pivotally mounted on the control plate 96 at ninety degree intervals, as seen in FIG. 6. Each of their housings 115 has an inwardly extended sleeve 127. A plunger 128 is slidably mounted in the sleeve and has an inner end pivotally connected, as at 129, to the sleeve 105 on the joystick 101 and an outer end engagable with the valve member 121 of its respective valve. Thus, it will be understood that the valve members of the various valves may be moved between their inner and outer positions in a cooperative manner by universal movement of the joystick 101. It is to be noted that the plunger 128 is only effective to move its associated valve member inwardly of its respective chamber 117 inasmuch as the plungers are not directly connected to the valve members. The springs 123, of course, return the valve members to inner position upon retraction of the joystick.

An annular supply pipe 135 interconnects all of the inlet ports 119 for the control valves 106, 107, 108 and 109 and is connected to the outlet of an hydraulic pump 136 by means of a delivery conduit 137. An annular return pipe 138 likewise interconnects the return ports 120 and is connected to a reservoir or sump 139 by means of a return conduit 140, as is clearly evident in FIG. 8. The pump provides an inlet connected to the reservoir by means of a conduit 141.

Forward and aft fins 145 and 146 are upwardly extended fore and aft on the fuselage 11 in alignment with each other and with the predetermined forward and rearward directions of flight. It is to be noted that the fins are mounted on the downwardly angulated section 52 of the airfoil portion 50. Fore and aft rudders 147 and 148 are mounted for pivotal movement around substantially vertical axes on pivot rods 149 upwardly extended from the fins. Levers 150 and 151 are rigidly secured in right angular relation to lower ends of the pivot rods within the fuselage and provide opposite ends 152, 153, 154 and 155, respectively. A V-shaped rudder control bar 156 is pivotally mounted on the control plate 96 on a post 157 downwardly extended therefrom. The bar has outwardly extended arms 158 and 159 individually connected to opposite ends of the levers 150 by means of rudder control cables 160 extended around pulleys 161. Specifically, arm 158 is connected by a cable to the ends 152 and 154 and arm 159 is connected to the ends 153 and 155. Port and starboard rudder control foot pedals 162 and 163 are mounted on opposite ends of the bar for pivoting the bar to apply tension to one or the other of the control cables. It is to be noted that with this arrangement, the rudders are oppositely angled by manipulating the control bar. That is, when the forward rudder rotates clockwise, the rearward rudder rotates counterclockwise, and vice versa.

Operation

The operation of the first form of the present invention is believed readily apparent and is briefly summarized at this point. With the ramp 33 in open position and rested on the ground or other support surface indicated at 165, the pilot may board the aircraft 10 by ascending the stairs 36 and entering the hatchway 35. The aircraft is also so loaded with whatever payload is to be carried. The ramp is then closed and locked. The pilot, not shown, takes his seat behind the controls and preferably places one hand on the throttle 78, the other hand on the joystick 101, and both feet on the rudder control pedals 159.

With the joystick 101 is neutral position, that is, exactly concentric to the opening 97 in the control plate 96, the engine 76 is started. To take off, speed of the engine is increased by manipulation of the throttle 78. The propeller 61 speed is thus increased and air is drawn axially into the propeller and is discharged centrifugally thereof. The baffles 64 and 65 guide the air in an axial direction into the propeller and the vanes 70 guide the air being discharged in a radial direction outwardly of the propeller. The propeller also draws air up through the opening 45 over the engine 76. It should be noted that this has a cooling effect on the engine. The air discharged by the propeller passes beneath the annular guide 72 outwardly through the slipstream passageway over the airfoil portion 50 of the fuselage 11. As is well known, when air is directed over a surface having the contour of an airfoil, the pressure above such surface is reduced. Such is the case in the present instance so that by forcing air outwardly over the airfoil portion, an annular area of reduced pressure is created above the fuselage relative to the air pressure on the lower wall 19 of the fuselage. This, of course, produces lift and raises the aircraft in a vertical path into the air. Most of the air thrown radially by the propeller 64 is drawn axially downwardly from above the aircraft. This creates a zone of low pressure above the aircraft which is also of lifting advantage.

In this manner the aircraft 10 is moved straight upwardly but may be made to hover in a fixed elevational position by adjusting the throttle so that the lift created balances the weight of the aircraft.

In order to fly the aircraft in a forward direction, the joystick 101 is moved forwardly. With particular reference to FIGS. 6, 7 and 8, this moves the forward valve member 121 to its outer position to establish fluid communication between the inlet port 119 and the control port 118. Hydraulic fluid is thus pumped through the forward control valve 106 into the forward azimuth tube 85 to inflate this tube. The forward tube expands upwardly into the slipstream passageway 73 toward the annular guide plate 72. This restricts the flow of air outwardly over the airflow portion 50 along the forward section of the fuselage 11. At the same time, with the propeller 61 rotating at a constant speed, the amount of air passing outwardly over the other segments of the airfoil portion is increased. Thus the lift on the forward part of the aircraft is decreased while the lift around the remainder of the aircraft is increased. The forward portion 24 of the fuselage goes down a slight amount and the aircraft moves in a forward direction. It may be necessary to adjust the throttle 78 while moving the joystick forward in order to fly the aircraft in a substantially horizontal forward direction.

In order to stop the aircraft 10, the stick 101 is brought back into neutral position, as will be apparent. The aircraft may be flown in a rearward direction or to either side by moving the stick in the corresponding direction to inflate the aft, port, or starboard azimuth tubes 86, 87 and 88 in the same manner as described in relation to the forward tube 85. Of course, the aircraft may be flown in directions in between these specified directions by moving the stick in corresponding directions to inflate adjacent pairs of tubes while diametrically opposite tubes remain deflated.

The rudders 147 and 148 may be applied to stabilize the flight of the aircraft by pressing on the foot pedals 162 and 163. If a right rudder is desired to angle the aircraft slightly to the right or starboard side, the right foot pedal 163 is depressed. Obviously, to angle the aircraft to the port side, a slight amount of left rudder is applied by pushing on the left foot pedal 162.

In order to land the aircraft 10, the joystick 101 is placed in a neutral position so that the aircraft is in a position with the shaft 55 substantially vertically disposed. The throttle 78 is then reduced so as to reduce the speed of rotation of the propeller to decrease the flow of air outwardly over the airfoil portion 50. This gently lowers the aircraft onto any desired support surface. As will be apparent, the tricycle landing gear provides balanced support for the aircraft and enables earth traversing movement. The nose wheel 42 is mounted for swivelling movement to enable convenient maneuvering of the aircraft on the ground.

Second Form

Figures 3, 4, 9:
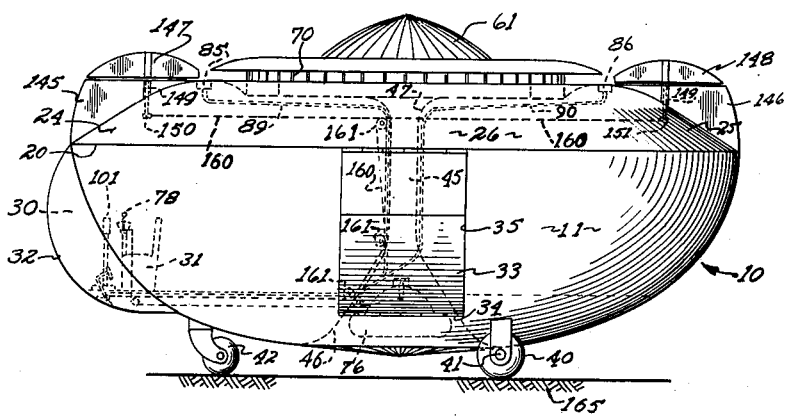
FIG. 3 is a vertical side elevation of the aircraft shown in FIGS. 1 and 2 but at a somewhat reduced scale.
FIG. 4 is a somewhat enlarged fragmentary top view of a portion of the aircraft with certain portions thereof in section for illustrative convenience.
FIG. 9 is a fragmentary vertical section of a second form of the aircraft of the present invention.

The second form of the present invention is illustrated in FIG. 9. An aircraft 180 is shown therein including a fuselage 181 having an annular side wall 182 and an upper substantially flat wall 183 preferably of circular shape concentric to a substantially vertical axis of symmetry. An annular outwardly convex air scoop 184 is upwardly extended from a marginal edge of the upper wall and is concentric to said axis.

A plurality of flat lower vanes 190 are mounted on the upper wall 183 in radial relation to said axis of symmetry and in spaced relation to each other. An annular lower platform or plate 191 is mounted on the lower vanes in substantially parallel relation to the upper wall of the fuselage 181. An annular airfoil 192 is mounted in spaced relation to the lower platform on a plurality of upwardly extended posts 193. The airfoil is thus mounted in a substantially horizontal position and has an inwardly disposed leading edge, an outwardly disposed trailing edge and has chords substantially radial to said axis. It is to be noted that the air scoop 184 provides an upper edge above the airfoil.

A bearing 196 is mounted on the upper wall 183 of the fuselage 181 and rotatably journals a drive shaft 197 therein as previously described. The drive shaft is coaxial with the axis of symmetry of the upper wall and has an upper end, and a lower end extended downwardly into the fuselage to be connected to a powered means, not shown, for rotating the shaft. A propeller 199 is mounted on the upper end of the shaft above the upper wall of the fuselage and provides a plurality of substantially flat vertically disposed blades 200 radiating from the shaft. It is to be noted that the blades are secured to the end of the shaft and extend slightly downwardly and outwardly therefrom. A pair of annular baffles 201 and 202 are mounted on the blades in concentric relation to the shaft for guiding air axially inwardly of the propeller.

A plurality of vertically disposed upper vanes 206 are mounted on the lower platform 191 between the propeller 199 and the airfoil 192 in spaced relation to each other and in radial relation to the shaft 197. An annular guide plate 207 is mounted on the vanes and extends above the propeller blades 200.

In other respects, the aircraft 180 is constructed like the first form of the present invention and is thus not described in further detail.

*Operation of Second Form*

Inasmuch as the aircraft 180 is controlled and may be flown in the same manner as the aircraft 10 of the first form of this invention, only the manner in which the second form of the invention obtains its lift will be reviewed.

Rotation of the propeller 199 draws air axially into the propeller guided by the baffles 201 and 202 and discharges such air centrifugally outwardly thereof. The upper vanes 206 direct the discharged air radially outwardly both over and under the airfoil 192. In a manner believed well understood, this creates a lower pressure above the airfoil than below the airfoil to impart lift to the aircraft 180. Furthermore, as the air leaves the trailing edge of the airfoil 192, it is picked up by the air scoop 184 and directed therealong back underneath the lower platform 191 and by the lower vanes 190 back toward the propeller shaft 197. The lower platform is curved upwardly at its inner edge to guide this air back into the propeller where it is again discharged outwardly in the path above described. Thus, not only is air drawn axially into the propeller but also such air is made to travel in a circuitous path so as to increase the volume of air passing toward the airfoil and thereby to increase the lift.

*Third Form*

The third form of the present invention is embodied in a structure quite similar to that shown in FIGS. 1 to 8 and 9 and is specifically illustrated in FIGS. 10 to 13. An aircraft 250 is shown having a fuselage 251, beams 252, an inner hull 253, an outer hull 254, and a floor 255. The inner and outer hulls define an upper wall 256 and a lower wall 257. As before, reference is made to fore, aft, port and starboard portions 260, 261, 262 and 263 respectively for convenience of description.

As before, the fuselage 251 has a compartment 270 including a cockpit 271, a pilot's seat 272 rearwardly of a plastic nose bubble 273 in the fuselage. The fuselage has a hatchway 274 indicated in dashed lines in FIG. 10 which may be provided with a ramp, not shown, as in the first form of the invention. A pair of rear wheels 280 and a swivel nose wheel 281 are provided in triangular relation and together form a tricycle landing gear.

The fuselage 251 circumscribes a central opening 285 having upper and lower ends and defining an axis about which the fuselage is substantially symmetrical. The upper wall 256 of the fuselage has a substantially flat inner portion 287, and an outer airfoil portion 288 as described for the first form of the invention. A drive shaft 290 is mounted coaxially of the fuselage in the opening 285 and provides a lower end having driven connection to an engine 291. A propeller 292 similar to the propeller 61 is mounted on an upper end of the drive shaft for rotation therewith. The propeller provides a plurality of radially extended substantially vertically disposed flat blades 293, and a pair of concentric annular baffles 294 and 295 are preferably secured to the blades in concentric relation to the drive shaft for the purposes already described.

Three cylindrical hollow supports 298 are upwardly extended from the inner portion 287 of the upper wall 256 of the fuselage 251 in substantially equally radially spaced relation from the drive shaft 290 and substantially equally spaced from each other circumferentially of the drive shaft. As best seen in FIG. 13, the supports have circumscribing grooves 299 and upper heads 300. As before, a plurality of vertically disposed radial vanes 302 are upwardly extended from the inner portion 287 in circumferentially spaced relation around the shaft and have inner arcuate portions curved in a common direction circumferentially of the shaft 290.

Annular control plate 305 overlies the vanes 302 and the supports 298 and provides an undersurface 306 having three circular recesses 307 spaced circumferentially of the plate at distances corresponding to the spacing of the supports 298. The plate provides circular shoulders 308 inwardly extended around the recesses, as best seen in FIG. 13. While the annular shoulders are shown as integral with the control plate for illustrative convenience, it will of course be understood that in actual construction the shoulders are more readily formed of semicircular or other segments which are bolted or otherwise rigidly and dependably secured upwardly against the control plate in circular association. The annular plate is mounted on the supports with the shoulders received in the annular grooves 299 and with the heads 300 fitted in the recesses 307. The heads and recesses are of such dimensions as to permit slidable movement of the annular plate on the supports between a position concentric to the drive shaft 290 and positions eccentric to the shaft 360 degrees thereabout. The annular plate defines a slipstream passageway 310 with the airfoil portion 288, as before, and it is to be noted that the movement of the plate enables constriction or enlargement of this passageway peripherally of the airfoil portion. For example, if the annular plate moves aft, the passageway at the aft portion 261 is constricted while the passageway around the forward portion 260 correspondingly enlarges. The annular plate also has elongated vertically disposed sockets 311 upwardly extended from the undersurface 306 concentrically of the recesses 307 and located above the supports.

A plurality of directional control rods 318, 319, and 320 provide upper ends having balls 321 slidably fitted in the sockets 311, lower ends 322, and are mounted intermediate their upper and lower ends, as at 323, for universal movement. The sockets are sufficiently large to permit limited universal movement of the rods relative to the annular plate 305.

A master control joystick 326 provides a handle 327 and a lower end 328 and is universally mounted at 329 on the lower wall 257 of the fuselage 251 forwardly of the pilot's seat 272. A slave joystick 335 is mounted for universal movement at 336 on a column 337 upwardly extended from the floor 255. The slave joystick has an upper end 338 connected to the lower ends 322 of the rods 320 by a plurality of flexible control cables or shafts 339. The slave joystick also has a lower end 340 downwardly extended through an opening in the floor rearwardly of the master control joystick 326.

A fore and aft flight control bar 345 has a forward end pivotally connected to the lower end 328 of the master control joystick 326 and a rearward end 347 pivotally connected to the lower end 340 of the slave joystick 335. The bar 345 includes a pair of sections rotatably interconnected by a coupling 348. A lateral flight control bar 349 has a forward end 350 providing an elongated slot 351 fitted over the lower end of the master control joystick, and a rear end 352 providing an elongated slot 353 fitted over the lower end of the slave joystick. The lateral flight control bar is mounted on a post 355 for pivotal movement around a substantially vertical axis.

The aircraft 250 also has fore and aft fins 360 and 361, and rudders 362 and 363 mounted on the fins for pivotal movement around substantially vertical axes. A rudder control bar 365 is mounted in the fuselage forwardly of the pilot's seat 272 and may be connected to the rudders for controlling their movement in the same manner as that described in connection with the first form of the invention. For clarity, however, these details have been omitted from FIG. 11.

*Operation of Third Form*

The operation of the third form of the present invention is similar to the operation of the first form except for the facilities provided for directional control. Accordingly, only the operation of the annular control plate 305 to control the direction of flight of the aircraft 250 will be summarized.

Assuming the aircraft 250 to be airborne and that it is desired to fly in a forward direction, the master control joystick 326 is shoved forwardly. This moves the flight control bar 345 forwardly, pivots the slave joystick 335 in a clockwise direction around pivot 336, as seen at FIG. 11, and thus applies tension to the control cable 339 connected to the rod 318 while correspondingly releasing the other control cables. The rod 318 is pivoted in a counter-clockwise direction around its universal joint 323, as viewed in FIG. 11, so that pressure is applied against the annular air guiding plate 305 by the ball 321 to push it forwardly of the aircraft. Thus, as indicated in dot dash lines in FIG. 10, the plate is moved forwardly over the forward section 260 of the airfoil portion 288 to restrict the annular air passageway 310 in the forward region and correspondingly to enlarge such air passageway around the aft section 261. As a result, a proportionately greater volume of air escapes through the passageway at the rear of the aircraft than at the front, the lift at the rear increases while the lift at the front correspondingly decreases, the aircraft tilts forwardly and moves forwardly.

During fore and aft movements of the joysticks 326 and 335, the lateral flight control bar 349 remains unaffected because such fore and aft movements of the joysticks are accommodated by the slots 351 and 353 in the bar 349. However, if it is desired to fly to the left or to the right, the master control joystick 326 is moved in a corresponding direction. If it is to be left, the control bar 349 is pivoted in a counter-clockwise direction, as seen in FIG. 12. This pivots the slave joystick 335 so that the upper end 338 thereof moves in the same direction as the master joystick and in a plane parallel thereto thereby to apply tension on the control cables 339 connected to the rods 318 and 319. It will be apparent that this moves the air guiding plate 305 toward the port side 262 of the aircraft 250 to restrict the air passageway 310 therearound and to increase such passageway on the starboard side 263. The port side of the aircraft tips downwardly and the aircraft flies to the left. Lateral movements of the joysticks are permitted by the fore and aft flight control bar 345 inasmuch as it includes rotatably connected sections.

It will be evident that the annular flight control or air guiding plate 305 may be moved from a central or normal position concentric to the shaft 290 to any positoin eccentric to the shaft within a radius determined by the extent of movement permitted by the fit of the recesses 307 on the heads 300. In order to fly in any desired direction, the master stick 326 is simply moved in such direction and held there. When it is desired to level off, the stick 326 is returned to neutral. The air pressure between the airfoil portion 288 and the guide plate tends to equalize so that when the stick is in neutral, the plate will tend to remain in its concentric position. The aircraft can then be made to hover, take-off, or land in a substantially horizontal position as described with regard to the first form of the invention.

From the foregoing it is evident that an annular fixed airfoil is employed by the present invention in a unique manner to provide lift in a vertical lift aircraft. Lift is thereby created in a more simplified manner than with prior types of vertical lift aircraft. The structural simplicity and operational stability in large measures overcome the problems discussed, in devices which are economical to produce, simple to maintain, and inherently of durable form.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A vertical lift aircraft comprising an annular fuselage symmetrical about a substantially vertical axis of revolution and having interconnected upper and lower walls, the upper wall including an annular airfoil portion circumscribing said axis and having chords substantially radial to the axis, a shaft rotatably mounted coaxially in the fuselage, an engine mounted in the fuselage and connected in driving relation to the shaft for imparting rotation thereto, a propeller secured to the shaft above the upper wall of the fuselage and positioned within the airfoil portion for drawing air axially inwardly thereof and discharging said air outwardly thereof, means mounted on the upper wall of the fuselage located between the propeller and the airfoil portion for guiding air discharged by the propeller in a radial direction from said axis and located above the airfoil to form an annular air passage with airfoil, and inflatable azimuthal control members mounted in the airfoil portion at predetermined peripheral locations therearound for selected distension into said air passage and contraction therefrom to control the flow of air outwardly over the airfoil portion whereby the resultant lift may be regulated and horizontal movement imparted to the aircraft.

2. An aircraft comprising a hollow fuselage substantially in the form of an annular torus having a substantially circular rim concentrically circumscribing an axis of symmetry, a lower wall, and an upper wall including an inner flat portion radial to said axis of symmetry and an outer annular airfoil portion concentric to said axis, the airfoil portion being upwardly curved from said inner portion and thence downwardly extended to the rim; an annular plate mounted on the body above the upper wall in substantially parallel relation to said inner portion and in marginally overlapping relation to the upwardly curved airfoil portion to define an annular air passage; a plurality of hydraulically inflatable tubes mounted in peripherally spaced relation in the airfoil portion distendible upwardly toward the annular plate to constrict said air passage at selected positions peripherally of the body; an hydraulic system connected to the tubes including directional control means within the body for controllably distending and collapsing the tubes; a shaft rotatably mounted in the body coaxial with said axis of symmetry; substantially flat vertical propeller blades radiating from the shaft above the inner portion of the upper wall for drawing in air axially thereof and for thrusting air radially outwardly through said air passage over the airfoil portion; powered means mounted in the body having driving connection to the shaft for imparting rotation to the blades; elevational control means in the body connected to the powered means for controlling the speed of rotation of the blades.

3. A vertical lift aircraft comprising a fuselage substantially in the shape of an annular torus symmetrical about a substantially vertical axis of revolution and having interconnected upper and lower walls, the upper wall including an inner flat portion radial to said axis and an outer annular airfoil portion upwardly curved from the inner portion and thence downwardly extended toward the lower wall, a shaft rotatably mounted co-axially in the fuselage, powered means mounted in the fuselage connected in driving relation to the shaft for imparting rotation thereto, a propeller including a plurality of substantially flat vertically disposed blades connected to and radiating from the shaft above the upper wall of the fuselage and positioned over said inner portion within the airfoil portion for drawing air axially inwardly thereof and discharging said air outwardly over the airfoil portion, annular substantially vertically disposed baffles mounted on the propeller blades in concentric relation to the shaft for guiding air axially into the propeller; a plurality of vanes mounted on the inner portion of the upper wall in spaced circumscribing relation to the propeller blades for guiding air discharged from the propeller in a radially outward direction; an annular plate mounted on the vanes extended over the airfoil portion to form an annular air passage therewith; a plurality of inflatable tubular members mounted in the airfoil portion at predetermined peripheral locations therearound; and azimuthal control means connected to the tubular members selectively inflating and deflating said members for distention thereof into said air passage to restrict the flow of air at selected locations around the airfoil portion and retraction from said air passage to increase the flow of air whereby lift created by said air may be relatively increased and decreased around said airfoil portion.

4. A vertical lift aircraft having a predetermined forward direction of travel comprising a hollow substantially toroidally-shaped fuselage symmetrical about an axis of revolution and circumscribing a central opening, the fuselage having predetermined fore, aft, port and starboard portions, an upper annular flat portion radially extended from the central opening and an annular airfoil portion curved upwardly and outwardly from the flat portion and thence downwardly angulated from the flat portion; a landing gear including ground engaging wheels supporting the fuselage for earth traversing movement; an elongated drive shaft mounted coaxially in the fuselage having an upper end extended above the fuselage and a lower end; a propeller mounted on the upper end of the shaft externally of the fuselage having a plurality of substantially flat vertically disposed blades rearwardly extended from the shaft above the flat portion of the fuselage and terminating inwardly of the airfoil portion; a plurality of peripherally spaced vanes mounted on said flat portion in radial relation to the shaft and circumscribing the blades for directing air from the blades radially outwardly of the shaft; an annular air guiding plate mounted on the vanes above the flat portion of the fuselage and marginally overlapping the propeller blades and the upwardly curved airfoil portion to form a slipstream passageway with the airfoil portion; an engine mounted in the fuselage having driving connection to the lower end of the shaft for rotating the propeller to draw air in axially of the propeller and to discharge air outwardly between the vanes and the passageway over the airfoil portion to cause a reduction in air pressure above the fuselage relative to the air pressure below the fuselage to produce lift; a plurality of vertically disposed cylindrical baffles mounted concentrically on the propeller blades in concentric relation to the shaft for guiding air axially into the propeller; elevational control means in the fuselage connected to the engine for controlling the speed of rotation of the propeller; inflatable elastic tubes mounted at fore, aft, port and starboard positions in the upwardly curved airfoil portion of the fuselage below the air guiding plate and being distendible and collapsible toward and from the air guiding plate in the slipstream passageway; an hydraulic system connected to the tubes including azimuthal control means in the fuselage for independently and collectively distending and collapsing the tubes to constrict and enlarge the passageway at said fore, aft, port and starboard positions thereby to regulate passage of air over said airfoil portion at said positions to enable azimuthal control of the aircraft; fore and aft fins upwardly extended from the downwardly angulated airfoil portion of the fuselage aligned with each other and with said predetermined forward direction of travel of the aircraft; upright rudders pivotally mounted on the fins for movement around axes substantially parallel to the axis of revolution of the fuselage; and rudder control means in the fuselage connected in controlling relation to the rudders for pivoting the rudders about their axes.

References Cited in the file of this patent

UNITED STATES PATENTS

| | | |
|---|---|---|
| 2,596,435 | Robert | May 13, 1952 |
| 2,807,428 | Wibault | Sept. 24, 1957 |
| 2,838,257 | Wibault | June 10, 1958 |
| 2,927,746 | Mellen | Mar. 8, 1960 |
| 2,944,762 | Lane | July 12, 1960 |